UNITED STATES PATENT OFFICE.

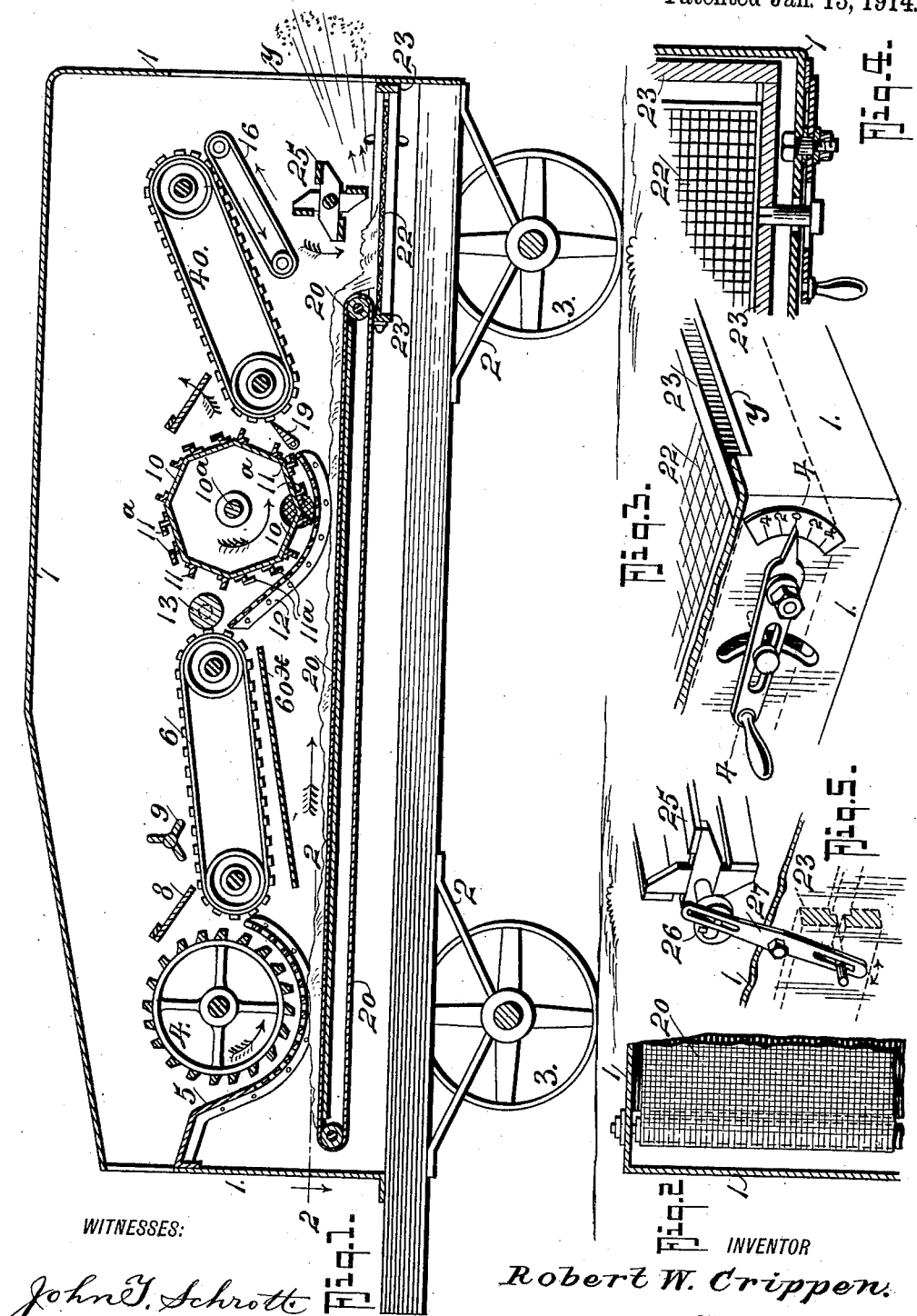

ROBERT WHITNEY CRIPPEN, OF ARLINGTON, KANSAS.

THRESHING-MACHINE.

1,083,993. Specification of Letters Patent. Patented Jan. 13, 1914.

Application filed January 13, 1911. Serial No. 602,465.

*To all whom it may concern:*

Be it known that I, ROBERT WHITNEY CRIPPEN, a citizen of the United States, residing at Arlington, in the county of Reno and State of Kansas, have invented certain new and useful Improvements in Threshing-Machines, of which the following is a specification.

This invention, which generally relates to means in threshing machines provided for effecting the separation of the straw, chaff and other extraneous matter from the grain kernels, in a quick, positive and economical manner, more particularly embodies certain improvements in the construction of the threshing machine disclosed in my Patent No. 931731 dated August 24, 1909.

In my patent referred to, certain improved devices are combined with the threshing cylinder, which devices include a pair of endless aprons mounted in the same longitudinal plane, a drum located between the aprons, adjustable beater devices that coöperate with the threshing cylinder and the discharge end of one of the endless aprons and the drum, other devices being also provided that coöperate with the drum, the cylinder and the aprons that are so arranged whereby to convey the straw through the machine at a very high speed. In the said patented machine a pan is located beneath the several separating devices for collecting the grain that falls from the said devices.

My present invention has special relation to means substituted for the grain pan for effecting a final and more perfect separation of the chaff and other light extraneous substances from the grain prior to its final exit or discharge from the thresher, and my said invention therefore consists in the peculiar combination and coöperative arrangement of the parts hereinafter fully explained, specifically pointed out in the appended claims and illustrated in the accompanying drawing in which:

Figure 1, is a longitudinal section of so much of my patented threshing machine as is necessary to illustrate the practical application of my present invention. Fig. 2, is a detail horizontal section of a portion of my machine taken substantially on the line 2—2 on Fig. 1. Fig. 3, is a detail view that illustrates the adjusting devices for setting the final separating or chaffer screen. Fig. 4, is a horizontal section thereof on the line 4—4 on Fig. 3. Fig. 5, is a detail view that illustrates the devices for shaking the chaffer screen.

In the drawing, 1 designates the main casing, 2—2 the truck frames that are mounted on the wheels 3—3.

4 designates the threshing cylinder at the infeed end of the casing and 5 the concave that coöperates with the cylinder.

6 designates the first of a pair of endless aprons or straw carriers, that receives the straw as it passes up from the concave 5.

8 designates an adjustable gage that checks the throw of the material as it is thrown up from the concave and directs it onto the endless apron 6.

9 designates a rotary beater, mounted over the front end of the apron 6 that agitates and beats the straw as it is carried forwardly on the apron 6 and effects a separation of the grain from the straw, it being understood that as the apron is of the slatted type the grain separations drop through the apron onto an inclined bottom plate $60^x$ from which they slide down onto an endless band or apron 20, hereinafter again referred to, and which in my present construction, is a substitute for the grain receiving pan shown and described in my patent hereinbefore mentioned.

10 designates a feeding drum that is located in advance of the delivery end of the carrier 6 and the said drum is mounted on a shaft $10^a$ that is transversely journaled in the casing, and in practice it is geared with the driving mechanism of the machine, in any suitable manner that will impart high rotary speed to the said drum.

Drum 10 in cross section is of polygonal shape to prevent the straw wrapping around it, and it has a number of transversely arranged and radially projected rake teeth 11 and angle cleats $11^a$, the said teeth and cleats, together with the grate-like concave 12 that coöperates with the said drum 10 provides for a positive and effective separation of the grain and straw as it passes from the first apron 6 to a second or final carrier apron 40 and to facilitate the proper feed of the straw as it passes over the discharge of the apron 6 to the concave 12, a roller 13 is located in the throat or receiving space between the front end of the drum 10 and the grate-like concave 12.

For causing the separation of the grain from the straw that passes over the concave 12, the discharge end of the concave 12 is below the horizontal axis of the drum and in close proximity to the receiving end of the second endless apron 40 constructed like the apron 6 but is held at a greater incline for the more effectively causing the separation of the grain from the straw as it is carried upwardly by the apron 40 and to regulate the passage of the material over the concave 12, one or more wind boards 19 are located in a throat or passage from under the drum 10.

For deflecting the separated grain particles that pass up over the apron 40 an inclined endless apron 16 is mounted under the upper end of the apron 40 that leads the grain back onto the endless band apron 20 before referred to.

The several parts, excepting the endless band 20, so far described, are arranged precisely the same as the like parts are shown in my patent referred to and their operation is the same as the action of parts in my patented machine, and no claim of the said parts, *per se*, is made herein.

In the operation of the parts referred to and as disclosed in my patent aforesaid, the grain is subjected to a number of treatments or actions as it passes from the threshing cylinder to the first apron 6, from thence to the drum 10 and concave 12 and thence to the apron 40, all of which actions tend to separate the grain from the straw and extraneous matter, the grain dropping into the pan 15 in my patented structure while the straw and other extraneous matter drops over or is blown out through the opening $y$ in the back end of the casing 1.

From the practical experience with a thresher constructed in accordance with my patent aforesaid, I have found that while the separating results are all to be desired, as the straw passes over the several aprons 6 and 40, the catching of the grain in a grain pan does not meet all the requirements for a perfect and clean separation of the grain from the straw and straw particles. To overcome the objections found in my patent referred to and to render the separation of the grain from the straw and the discharge of the grain from the machine absolutely free from chaff and the smaller particles of straw I have provided the improved features disclosed in this application, and which, in connection with the endless conveyer band 20 that is substituted for the pan 15 in my patented machine, include a chaffing screen 22 located under the discharge end of the apron 40 and in a plane below the apron or band 20 with one end projected under the said discharge end of the apron or band 20 to receive the grain collected thereon, which discharges onto the screen 22.

Screen 22 is reciprocably mounted in a shoe 23 pivotally connected at the forward end to the casing, so its outer end can be readily adjusted by suitable devices, see Fig. 3, to bring the discharge end of the shoe at more or less incline to the blast fan 25 that is mounted over the screen 22 and serves to blow off the chaff and light particles through the opening $y$ in the end of the casing as the grain is deposited from the apron or band 20 onto the screen 22 and to provide for a thorough separation of the chaff from the grain as it passes onto the screen 22 and for the discharge of the cleaned grain from the machine, the screen 22 is agitated by any suitable means actuated from a continuously moving part of the machine, say, for example, from the shaft of the fan 25, which may be provided with an eccentric disk 26 that actuates a rocker lever 27 which in turn connects with and imparts reciprocable motion to the screen 22, as the lever is rocked from the fan shaft 25, see Fig. 5.

What I claim is:

1. In a machine of the character described, a primary grain separating mechanism, a supplemental means for separating the grain from the chaff and straw at the discharge end of the machine, means for conveying the primarily separated grain onto the aforesaid supplemental separating means, said supplemental separating means including a reciprocatory screen, a fan above the screen and means connecting the fan shaft and the screen for imparting motion to the screen, said connecting means comprising a rocking lever, a pin and slot connection between said lever and said screen, and a crank and slot connection between said lever and said fan shaft, substantially as shown and described.

2. In a machine of the character described, a means for separating primarily separated grain which comprises in combination with the conveyer for conveying the primarily separated grain, of a screened frame on to which said conveyer deposits the primarily separated grain at one end of the screen, a blower located above the screen for discharging the chaff and stuff off the screen while the grain passes through the screen, said fan including a fan shaft, a rocking lever having a crank and slot connection with said fan shaft, a pin and slot connection between said lever and the entrant end of said screened frame, a slotted lever mounted adjacent to the discharge end of said screened frame, a connection between said slotted lever and said screened frame in virtue of which the plane of said screen frame may be varied as conditions may require, substantially as shown and described.

ROBERT WHITNEY CRIPPEN.

Witnesses:
H. M. FERGUSON,
C. K. MAUCK.

Copies of this patent may be obtained for five cents each, by addressing the "Commissioner of Patents, Washington, D. C."